(12) United States Patent (10) Patent No.: US 8,950,368 B2
Strother (45) Date of Patent: Feb. 10, 2015

(54) INTERNAL COMBUSTION ENGINE AND WORKING CYCLE

(71) Applicant: John Allan Strother, Princeton, NJ (US)

(72) Inventor: John Allan Strother, Princeton, NJ (US)

(*) Notice: Subject to any disclaimer, the term of this patent is extended or adjusted under 35 U.S.C. 154(b) by 0 days.

(21) Appl. No.: 13/999,913

(22) Filed: Apr. 3, 2014

(65) Prior Publication Data

US 2015/0000642 A1 Jan. 1, 2015

Related U.S. Application Data

(60) Provisional application No. 61/841,729, filed on Jul. 1, 2013.

(51) Int. Cl.
*F02B 75/28* (2006.01)
*F02B 75/02* (2006.01)

(52) U.S. Cl.
CPC ........... *F02B 75/02* (2013.01); *F02B 2075/025* (2013.01)
USPC .................... 123/51 BA; 123/50 R; 123/52.5; 123/65 R

(58) Field of Classification Search
CPC .... F02D 13/028; F02B 3/06; F02B 2075/025; F02B 1/12
USPC ................ 123/51 BA, 50 B, 50 R, 52.5, 65 R
See application file for complete search history.

(56) References Cited

U.S. PATENT DOCUMENTS

| 2,773,490 | A | | 12/1956 | Miller | |
|---|---|---|---|---|---|
| 4,240,381 | A | | 12/1980 | Lowther | |
| 4,300,486 | A | | 11/1981 | Lowther | |
| 4,306,526 | A | | 12/1981 | Schaub | |
| 4,473,051 | A | | 9/1984 | Chorman | |
| 4,805,571 | A | | 2/1989 | Humphrey | |
| 5,101,794 | A | * | 4/1992 | Van Blaricom | 123/472 |
| 6,276,334 | B1 | * | 8/2001 | Flynn et al. | 123/435 |
| 6,848,416 | B1 | * | 2/2005 | Pien | 123/305 |
| 6,915,776 | B2 | * | 7/2005 | zur Loye et al. | 123/304 |
| 8,215,292 | B2 | | 7/2012 | Bryant | |
| 2002/0185109 | A1 | * | 12/2002 | Flynn et al. | 123/435 |
| 2011/0265759 | A1 | | 11/2011 | Lio | |
| 2012/0291756 | A1 | * | 11/2012 | Howard | 123/48 D |
| 2013/0008408 | A1 | * | 1/2013 | Furr | 123/197.4 |

* cited by examiner

*Primary Examiner* — Noah Kamen
*Assistant Examiner* — Long T Tran

(57) ABSTRACT

In a reciprocating internal combustion engine operating on a two-stroke cycle, the power stroke is followed by an abbreviated exhaust phase which ends with a portion of the exhaust products retained for recirculation, then by an abbreviated intake phase wherein pressurized new air is introduced, then by an abbreviated compression phase which completes the cycle. Fuel injection and ignition then initiate the next power stroke. Intake and exhaust take place through cylinder-head valves. The combination of a full expansion stroke with an abbreviated compression phase can offer efficiency superior to that of existing engines. Due to flexibility in the amount of pressurized air that can be introduced during intake, and because of the recirculation of relatively large amounts of exhaust gas, cylinder temperatures can be reduced, as can the emission of undesirable exhaust products.

17 Claims, 3 Drawing Sheets

A - POWER

B - EXHAUST

C - INTAKE

D - COMPRESSION

INTERNAL COMBUSTION ENGINE AND WORKING CYCLE

This application claims the benefit of U.S. Provisional Patent Application No. 61/841,729 of John Alan Strother filed Jul. 1, 2013 and entitled "INTERNAL COMBUSTION CYCLE."

FIELD OF THE INVENTION

The present invention relates to reciprocating internal combustion engines and working cycles thereof which provide improved efficiency and reduce undesirable emissions.

BACKGROUND OF THE INVENTION

Improving the efficiency of internal-combustion engines is germane to reducing the rate of depletion of fossil fuels and to limiting or reducing the emission of carbon dioxide into the atmosphere. Its urgency is emphasized by increasingly stringent government mandates on fuel consumption. The best efficiencies presently publicly claimed for reciprocating internal combustion (IC) engines are approximately 40 percent. One well-known method of improving efficiency is to employ artifices whereby the effective compression ratio is less than the expansion ratio. The present invention emphasizes this technique and offers larger improvements than heretofore realized.

Reducing the emission of pollutants other than carbon dioxide in response to both air-quality concerns and potential adverse climatic effects is presently achieved by methods whose cost could potentially be lowered if the raw engine exhaust contained lower levels of pollutants requiring neutralization. One known means of limiting internal generation of pollutants is to minimize peak combustion temperatures. The present invention emphasizes the reduction of peak temperatures and reduction of the time spent at high temperatures within each cycle. The features of the invention directed to the reduction of peak temperatures consist in part of novel extensions of the existing methods known as exhaust-gas recirculation and lean-burn.

SUMMARY OF THE INVENTION

The present invention is a two-stroke-cycle reciprocating internal combustion engine, in which the power stroke is followed by an abbreviated exhaust phase which ends with some exhaust products deliberately retained for recirculation, then by an abbreviated intake phase during which new air, or other oxygen-bearing gas or oxygen-bearing gas-and-vapor mixture, is introduced from a pressurized source, and finally by an abbreviated compression phase which completes the second stroke of the cycle. Fuel injection and ignition then initiate the next power stroke.

Intake and exhaust take place through valved cylinder-head ports; cylinder-sidewall ports are not used. Because the abbreviated compression phase results in a compression ratio much less than the expansion ratio, the expansion ratio can be and will be chosen to be substantially larger than would be used in a conventional engine. Use of the large expansion ratio increases the efficiency of fuel-energy conversion to output energy. The large expansion ratio also results in relatively low temperatures and pressures in the exhaust gas, which in turn improve the practicality and effectiveness of the incorporated internal exhaust-gas recirculation, eliminating the need for external recapture of the recirculated exhaust gas and reintroduction to the cylinder.

Because of the engine's flexibility as to the amount of air or other oxidant that can be introduced under pressure during the intake interval, and because of the recirculation of relatively large amounts of exhaust gas, the engine and its cycle offer improved means of limiting peak combustion temperatures and thereby reducing the generation and emission of undesirable exhaust products. The use of large expansion ratios causes the pressure and temperature to drop rapidly from their peak values after combustion begins, thereby also reducing the levels of pollutants by minimizing the time spent under conditions conducive to their generation.

Other features and advantages of the invention will be apparent from the following more detailed description, in conjunction with the accompanying drawings which illustrate the principles of the invention.

BRIEF DESCRIPTION OF THE DRAWINGS

With reference to FIG. 2, a power stroke or phase takes place between the illustrative locations labeled "1" and "2," an exhaust phase begins at or near location "2" and continues to location "3," an intake phase using a mildly-pressurized source of air or other oxygen-bearing gas or oxygen-bearing gas-and-vapor mixture begins at or near location "3" and continues to location "4," and a compression phase takes place between illustrative locations "4" and "5."

DETAILED DESCRIPTION

Figure 1:
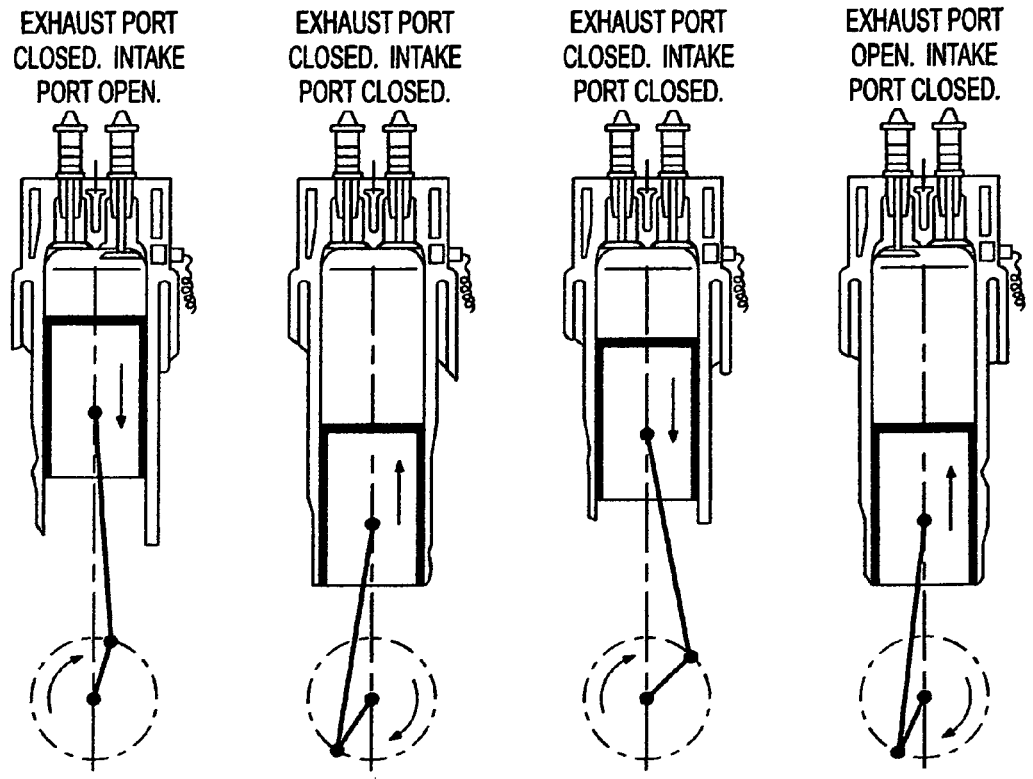
FIG. 1 uses four cross-sectional views of a simplified schematic drawing of one cylinder of a conventional four-stroke cycle internal combustion engine to illustrate the basic sequence of functions and the positions of pistons and exhaust and intake valves during each phase or stroke.
Figure 2:
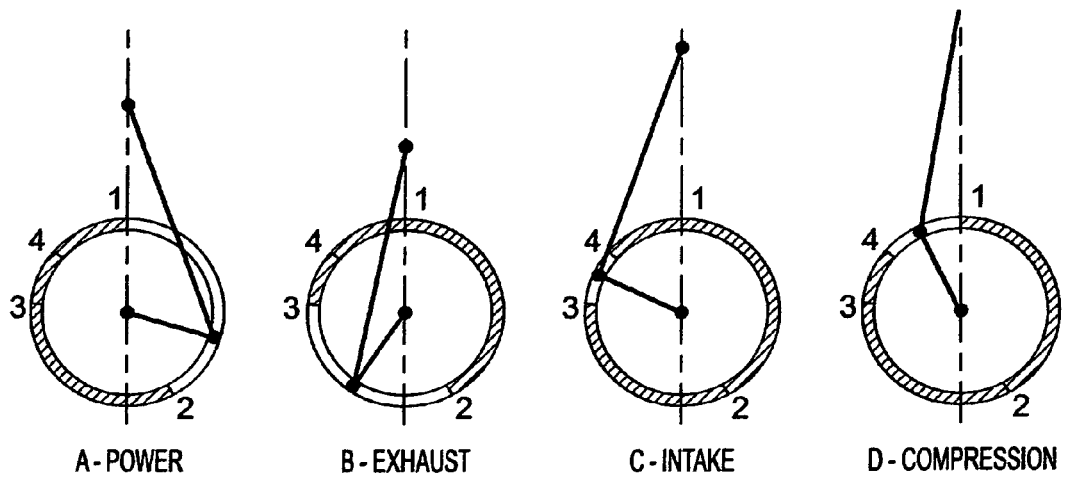
FIG. 2 shows illustrative piston 14 positions of the invention symbolically by displaying the sequence of positions and angles of the connecting rod 18 between the piston 14 and the crank arm 16A, 16P through which it drives the crankshaft 16, as well as those of said crank arm. The sequence of drawings represent piston positions for one cylinder of an engine using the two-stroke cycle of the invention during the corresponding phases of its operation; valves and valve positions are not shown; their schematic configuration would be the same as in FIG. 1, and the valve positions follow the same essential sequence, as discussed further below.
Figure 3:
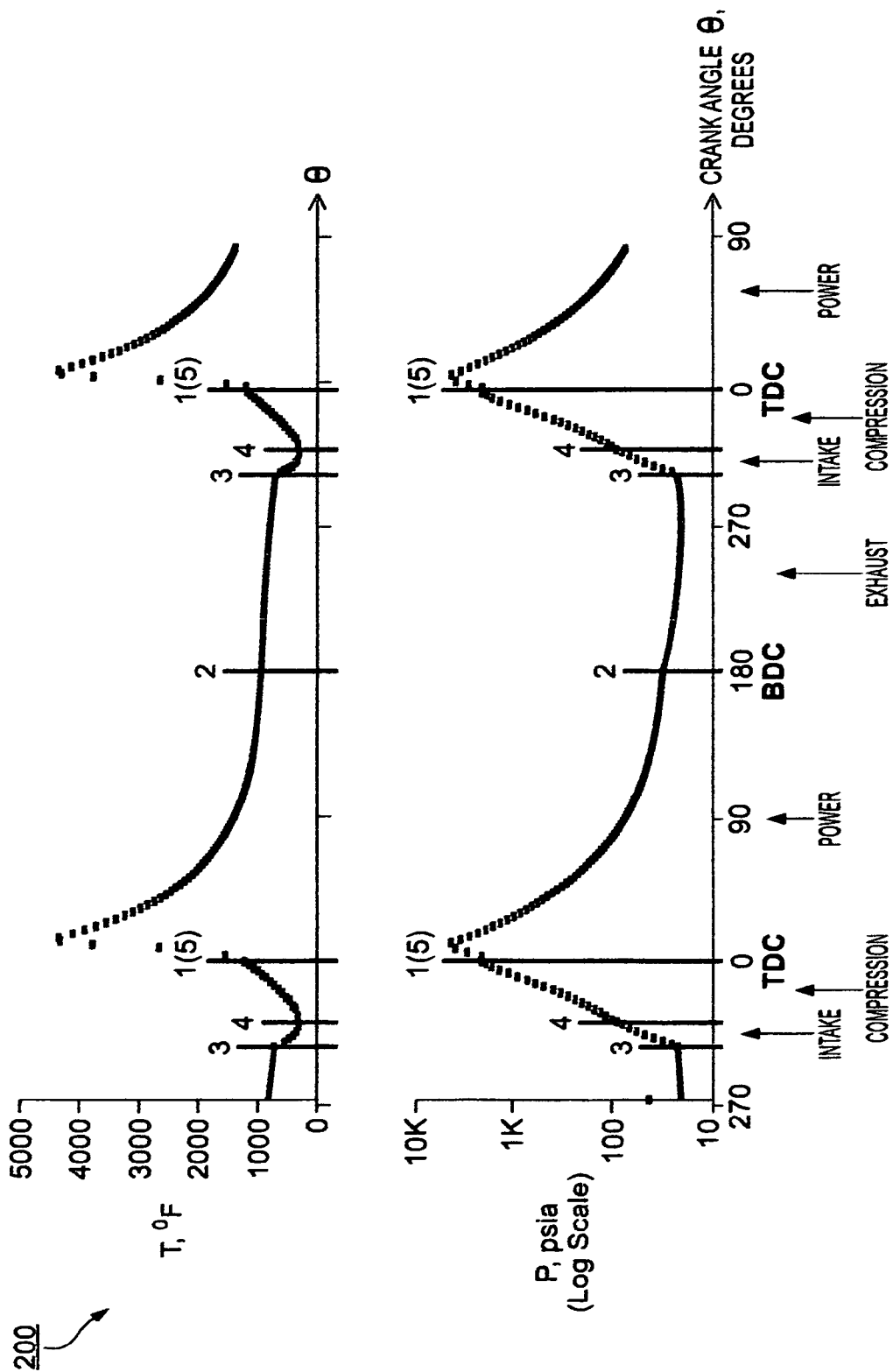
FIG. 3 shows an internal combustion engine cycle timing diagram corresponding to the operating cycle 200 illustrated by the cycle sequence shown in FIG. 2, wherein temperature T and pressure P are shown versus crank angle $\theta$.
Figure 4:
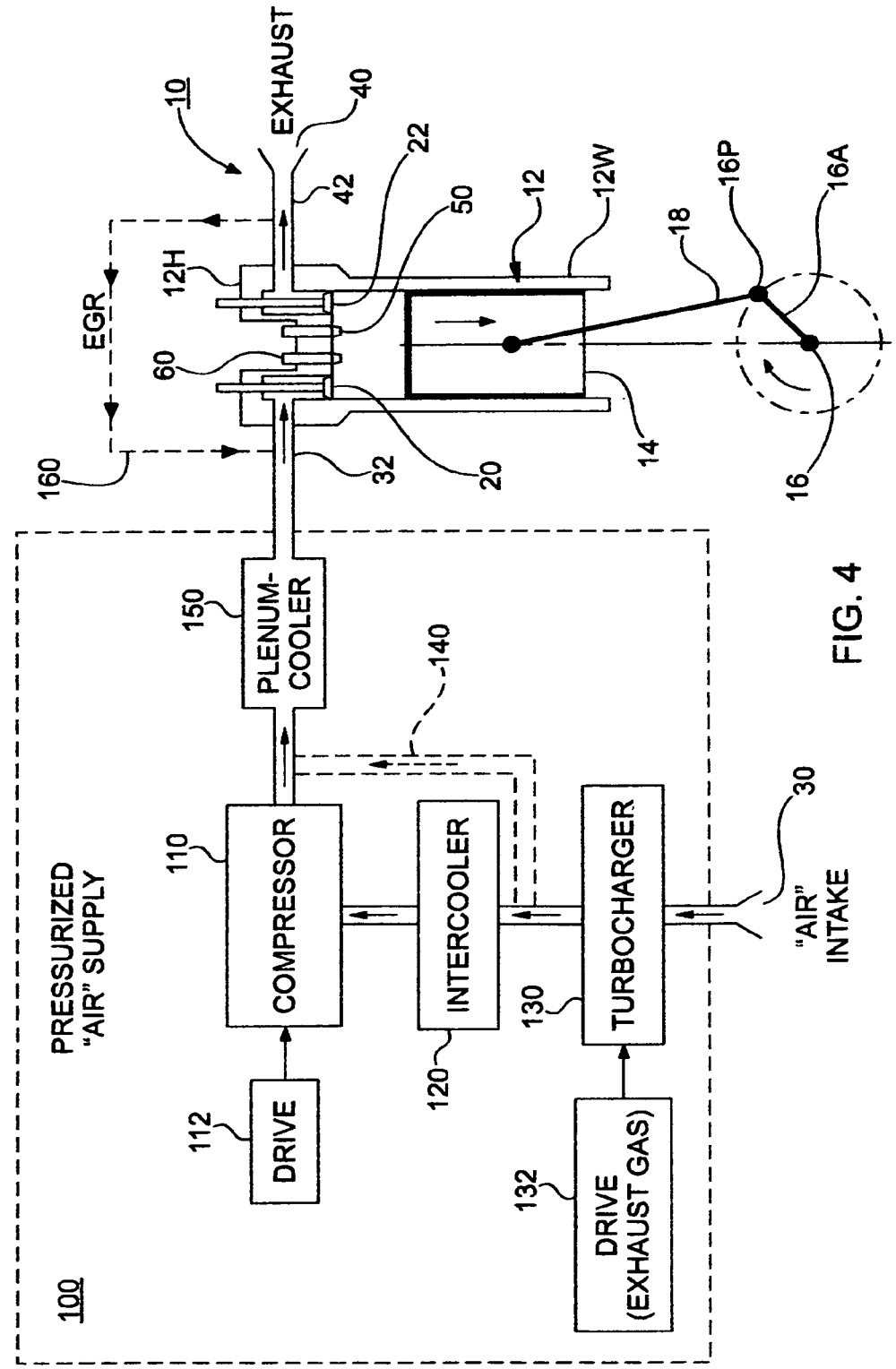
FIG. 4 is a schematic diagram of an example embodiment of an internal combustion engine 10 including an example embodiment of a pressurized air supply 100.

To describe in more detail the invention's configuration and operation, attention is directed to FIG. 2 and FIG. 3, which illustrate the sequence of operation 200 of one cylinder 12 of an engine 10 of FIG. 4 of any desired number and arrangement of cylinders 12. Angular locations on the drawings (and as used in this text) proceed clockwise from zero degrees at the position denoted "1" on said drawings. This location corresponds to the position where the piston 14 is at its closest approach to the cylinder head 12H, and is often referred to as top dead center ("TDC"). The power phase begins when the piston 14 is at or near this location. Cylinder charging with air and/or other oxygen-bearing gases has been completed during the latter phases of the preceding cycle. Reference to "air" hereinafter is meant to include oxygen-bearing gases or gas-vapor mixtures of any chemical and physical composition suitable for providing an oxidant for the fuel and a working fluid for the engine 10. Fuel introduction, by direct injection 50, is at or near TDC, followed closely by ignition, which can be accomplished by electric spark 60 or by other means, including compression heating when appropriate. In practice, it is anticipated that injection 50 will usually begin and ignition 60 will be triggered at least slightly before the piston 14 reaches TDC, the amounts of such angular advance to be determined so as to ensure that no appreciable force due to combustion is applied to the piston 14 before it has passed TDC.

As combustion proceeds and its heat propagates through the gas charge in the cylinder 12, power is generated by the expansion against the piston 14 of the heated products of combustion and of the heated unburned residual gases and/or vapors.

At the location denoted "2" on the drawings, whenever during a rotational cycle it is deemed that the useful generation of power has been effectively completed, an exhaust valve 22 (or valves 22) opens its theretofore-closed port in the cylinder head 12H, terminating the power phase and beginning exhaust. This location will typically be in the vicinity of 180 degrees, also referred to as bottom dead center, or "BDC." Depending on the choices of the designer and on the operating conditions, the exhaust valve 22 (or valves 22) may be opened somewhat before BDC; usually this would be done when the cylinder pressure has fallen close enough to atmospheric that further delay in opening the exhaust valves 22, and consequent further reduction in pressure as expansion continued, would lead to substantial backfilling 160 of the cylinder 12 from the external exhaust system when the exhaust valves 22 were eventually opened.

Exhaust continues to a location denoted as "3" which is usually chosen to be approximately one-half to three-quarters of the way from the beginning of exhaust back toward TDC, as measured by rotation of the crankshaft 16. Extreme angles from as early as 260 degrees to as late as 335 degrees have been used in some simulations.

In principle, intake begins when exhaust ends. An intake valve 20 (or valves 20) in each cylinder head 12H opens its theretofore-closed port 20 to admit air from a pressurized supply 100. In practice, since valves do not open or close instantaneously, the end of exhaust and the beginning of intake will overlap slightly. Some deliberate overlap may be used if it is known that the resultant scavenging 160 of some of the remaining exhaust gases is advantageous relative to any loss of newly inducted air that might occur at the same time.

The pressurized air supply 100 coupled to the input ports 20 may be from an independent external source 100 whose pressure is known and fixed. However, for most embodiments it is anticipated that the air will be supplied by means 100 dedicated to the requirements of the engine, through a chamber 150 or plenum 150 serving to minimize the influence of pressure fluctuations in the air source 100 on the pressure presented to the engine 10 and to minimize similar fluctuations of pressure at the air source output interface that would otherwise arise from the intermittent air demands of the engine 10. The plenum 150 also serves the intended function of providing as much cooling as possible of the pressurized air during its passage from the compressor 100, 110 or other source to the engine 10.

Since the gases remaining in the cylinder 12 at the end of exhaust will become part of the cylinder charge for the next cycle, both the desired amount of retained exhaust 160 and the needed amount of new air to be introduced during the intake phase enter into the determination of the appropriate crankshaft angle for the transition from exhaust to intake. At most engine speeds and output power levels, choice of said angle tends not to be critical to the attainment of maximum efficiency; variations of up to plus or minus 10 degrees from the angle determined to be optimum for overall efficiency at a given speed and power requirement generally reduce efficiency by less than 1.0 percent. However, peak temperature and pressure are more strongly affected. The earlier the transition from exhaust to intake, the larger the amounts of both retained exhaust products and new air; the larger total mass of the pre-combustion charge results in lower peak temperatures. Typical combined effects on pressure, temperature, and efficiency are further illustrated in Table 1 and its associated discussion below.

At high speeds and high output power levels, the optimum angle for the start of intake tends to move to a smaller, earlier value, and becomes more critical as the condition is approached at which there is enough time only for induction of the air charge which barely supplies enough oxidant for the combustion of the next injection of fuel. Use of the largest possible valve 20, 22 openings extends the range of speeds and powers which can be supported. If higher air-supply pressure can be provided without unsatisfactory impairment to overall efficiency, its use offers another option for extension of the speed and power capacity of a particular embodiment of the invention.

Intake takes place from the location denoted "3" to that shown as "4". The actual duration will depend on choices to be made by the designer and optionally in some embodiments by controlled adjustment of the duration as appropriate to speed and power demand. Over most of the operating conditions and design parameters so far explored by simulation, a typical duration has been between 15 and 25 degrees. As simulated to date, the duration stays in this range up to 7200 revolutions per minute (RPM) under conditions of moderate to heavy power demand. Thus it remains practical for cam-driven valves 20, 22 to be opened and closed precisely enough and to use satisfactorily small amounts of mechanical power for their actuation.

Nominal intake angular durations of less than 15 degrees would accomplish full air-charge loading at lower speeds and at relatively low engine power levels, but would become progressively more difficult to implement with cam-operated valves 20, 22 as the angle-span decreases below 15 degrees. One method for adjusting air delivery rate for such conditions is variable valve lift, as is already incorporated in some existing engines, wherein the effective area of the air-intake passageway 32 is adjusted by opening the poppet valve 20, 22 to a controlled distance from its seated position that is smaller than said distance is in the fully-open position which allows the valve-port 20, 22 diameter to be the principal determinant of air-flow rate.

For controlled low-air-flow-rate operation, the effective area of the air passageway 32 can also be reduced by the use of adjustable throttling just outside the intake ports 20. The choice between this method and variable valve lift is open to the designer of each specific embodiment of the invention.

The instant invention also inherently embodies a simpler adaptation to the situation wherein the angular span of the intake phase is constrained by the characteristics of simple cam-driven valves 20, 22 to a value no smaller than about 15 degrees. Leaving the intake valves open over a minimum fixed angular span at lower speeds tends to result in the induction of larger amounts of air than needed, but the process is self-limiting. When the pressure in the cylinder 12 has risen to the pressure in the plenum 150 (or other air source 100), air stops flowing to the cylinder 12. The cylinder pressure is kept approximately constant for the rest of the time the intake valves 20 are open, because as the piston 14 rises, tending to increase the cylinder pressure, the open intake valve 20 allows the excess air—and a small portion of the residual exhaust gas—to flow back into the supply chamber 150. Except as limited by the rate of air flow in relation to any given engine speed, the combined final charge of new air and retained exhaust is determined by the net remaining cylinder volume when the intake valve 20 closes and by the air pressure in the supply 100. The cylinder pressure remains very nearly equal to the plenum pressure since only a small pressure differential is needed to stimulate the slow regurgitation of cylinder 12 contents into the much larger volume of the plenum 150. If the spillback interval is relatively short and the amount of gas returned to the plenum 150 is relatively small, it is reasonable to expect that the gas returned to the plenum 150 will consist mostly of the air most recently passed to the cylinder 12 from the plenum 150, and that the amount of retained exhaust gas 160 that gets into the air-supply plenum 150 will be insignificant.

As stated above, the angular location where intake begins is envisioned to be adjustable in most preferred embodiments of the invention. Such so-called variable valve timing, usually implying a fixed angular span of intake or exhaust but a variable start angle thereof, is a well-known and frequently-used feature of modern automobile engines. It can be accomplished by varying the routing of a drive belt or drive chain between the crankshaft 16 and the driven camshaft or camshafts that operate the valves, in such a way that the lag angle between a reference position on the driveshaft and similar reference positions on the camshafts is adjusted as desired.

Independent control of exhaust valve 22 timing and intake valve 20 timing is possible, but is not visualized as necessary in the preferred embodiments of the invention. Simulation results to date have shown no obvious advantage of varying the relative timing of exhaust valve 22 closing and intake valve 20 opening during normal engine operation at speed; simplistically, delayed closing of the exhaust valves 22 would result in some precompressed new air being vented and thus "wasted," while dead time between the end of exhaust and the beginning of intake would result in larger amounts of retained exhaust gas 160 in relation to the reduced amount of new air that could be inducted into the shrinking cylinder 12 volume. If these arguments are in fact overly simplistic in the context of some future embodiment, independent variable valve timing for intake and exhaust can be incorporated as necessary.

Active control of the angular duration of intake could at times seem desirable. Its implementation would be intrinsically more complex than is the control of the start angles while angular spans remain fixed. However, most if not all of the net effects desired on the amount and timing of air intake can be accomplished by a combination of variable start angle, fixed angular duration, and variable valve lift (or equivalent control of effective inlet size); combinations of these methods is anticipated to provide sufficient flexibility in most application environments.

At location "4" in the drawing of FIG. 2. and FIG. 3, the intake valve 20 (or valves 20) closes and the compression phase begins, to be continued back to TDC. The compression ratio associated with this final phase of the cycle, because it starts at an angle typically in the vicinity of about 315 to about 335 degrees, will usually be from about one-fourth to about one-eighth of the expansion ratio built into the engine 10. In one configuration at a typical operating point, with the intake valve 20 closing in the vicinity of 35 degrees before TDC and with a built-in expansion ratio of 67.5-to-1, the mechanical compression ratio between the end of intake and TDC is 8.95-to-1. The "ratio of ratios" for this configuration—the ratio of expansion ratio to compression ratio—is 7.46. If the same valve-closing angle were embodied in an engine following the invention but having an expansion ratio of 10-to-1, somewhat below the lowest ratio at which the invention is envisioned to be potentially useful, the compression ratio from 35 degrees before TDC to TDC would be 2.09-to-1. The resulting ratio of ratios—expansion to compression—is 4.79.

Some compression work is done by the piston 14 before the closing of the intake valve 20 at location "4". As the remaining enclosed volume between the cylinder head 12H and the piston 14 decreases during the intake phase, and as more air is forced in from the plenum 150, the pressure increases at a rate roughly proportional to angle. Since the total gas or gas-and-vapor charge is increasing as air flows in, the work done is less than would be done if the entire charge were present at location "3", but it is not negligible when calculating the effective advantage of expansion ratio over compression ratio. The mathematically determined expansion-to-compression ratios in the examples given above are therefore illustrative rather than exact; however, the extra compression work done during intake is fully accounted for in the simulations and in the results and projections presented herein.

In order to provide at minimum enough air for combustion of the amount of fuel programmed to be injected 50 (the "stoichiometric" amount), and usually in the invention substantially more than enough, the air supply 100 to the intake valve 20 is mildly pressurized. Whether the air-plenum 150 pressure is meant to be predetermined at a particular value or to be adjusted during operation is a choice open to the designer of any particular embodiment. In automotive or other stand-alone applications, the air compressor 110 supplying the plenum 150 is visualized generally as being driven by the engine 10 or integral to the engine 10. If an adequate source of electric power 112 is known to be available, the compressor 110 may be chosen to be electrically driven, whereby additional flexibility may be available for control of its output pressure and of the rate of air delivery. External sources 100 of compressed air may also be used if conveniently available.

In most simulations to date a typical pressure in the air-supply plenum 150 has been about 70 to about 75 psia (pounds per square inch absolute). The performance and efficiency advantages of the invention also continue to prevail at simulated pressures of from 50 to 90 psia. To enable realistic projections of net efficiency for engines 10 using a dedicated compressor 100, 110, compressor drive-power requirements have been determined for output pressures from 50 to 90 psia by simulation of a single-stage single-cylinder reciprocating compressor 110. In a particular embodiment, any suitable type and design of compressor 100, 110 can be used.

If the compressor system 100 is dedicated to the engine 10, its output pressure, and/or the rate at which air is ingested and egested—often referred to as air "throughput"—would potentially be subject to improvement if the input air fed to the compressor 110 were first precompressed by an exhaust-driven turbocharger 130. In addition, for given specified values of output pressure and air throughput, the drive-power requirements of the compressor 110 would be reduced if its input air were precompressed by such a turbocharger 130. In either case, the output air from the turbocharger 130 would preferably be passed through an intercooler 120 before delivery to the main compressor's 110 input port, to cool it and increase its density.

If in some embodiments it were possible for an exhaust-driven turbocharger 130 acting by itself to produce 140 the intended pressure in the air plenum 150 at the intended rate of air flow, the efficiency of such an embodiment would be expected to be superior to any of the results projected by simulations and analyses done to date.

If in a particular embodiment the air comes from an existing compressed-air source 100, it is generally assumed to be at or near room (i.e. ambient) temperature. If the compressor 110 is dedicated to the engine in other embodiments, its output should be coupled to the engine intake manifold 32 by way of an air chamber 150 or plenum 150 serving both pressure-buffering and post-cooling purposes, as described earlier.

Some simulations have been done outside the typical range of input air pressures from 50 to 90 psia, downward to about 25 psia and upward to about 200 psia. The engine 10 works well—with progressively increasing capacity as to speed and/or power as the pressure is increased—but overall efficiency projections over this wider range are unreliable because the power requirements allocated to the compressor 110 are based on undocumented extrapolation from those pertaining to 50 to 90 psia. 200 psia is well outside the practical capability of single-stage reciprocating compressors 110, or of any relatively simple type of compressor suitable for dedicated use with an engine 10 based on the invention. Pressures much above 90 psia would be used only if an external air source were available.

Air pressures above about 200 psia from any source tend to become incompatible with the instant invention because high pressure dictates intake intervals that are both short and late in the rotational cycle. The angular duration eventually becomes too short for use of conventional cam-driven valves, and the lateness of the angle where intake ends increases the difficulty of preventing interference between valves and pistons.

Air-supply pressures below 50 and down to 25 psia are easily attained and are projected by the simulations to permit realization of the advantages of the invention in uses demanding relatively low rates of air induction, such as at low engine speeds and low output power levels.

Present-day IC engines typically use compression (and expansion) ratios limited to the approximate range of from 8-to-1 to 12-to-1 for spark-ignition engines and up to a maximum of about 25-to-1 in diesel engines. It is known that higher expansion ratios would yield improved efficiencies (as they do in diesel engines), but conventional designs have been constrained in part by the countervailing power requirements of compressing input air to high ratios and by the high temperatures and pressures that arise from compressing the air charge adiabatically during the single compression stroke of a conventional engine. The significant reduction in compression ratio afforded by the instant invention relative to its mechanical expansion ratio makes practical the use of expansion ratios of up to more than 50-to-1, both the high expansion ratio itself and the large ratio of expansion to compression offer improvements in the percentage of fuel energy that can be converted to shaft rotational energy available for use external to the engine 10.

Efficiency improvement by methods related to the use of asymmetrical expansion and compression ratios have been attempted at least since the time of the Atkinson patent (U.S. Pat. No. 367,496). The simplest and most successful and durable alternative to the Atkinson cycle is apparently the Miller cycle (U.S. Pat. No. 2,773,490). Neither patent is closely related to the present invention. The Atkinson cycle uses a linkage between the crankshaft and pistons which results in alternating changes in the volume swept by the piston. The intake and compression strokes are physically shorter than the power and exhaust strokes.

The Miller cycle patent in its several variations describes valve-timing adjustments which result in shortened angle-spans over which compression occurs. The patent discusses both four-stroke and two-stroke cycles. In its only description of how it applies to two-stroke engines, intake air is provided only by way of cylinder-wall ports opened and closed by the piston. Shortening of the compression interval in the two-stroke context is done by delaying the closing of a conventional exhaust valve until air that has previously been loaded but that is not needed for efficient combustion has been dumped out through the open exhaust valve.

Both the Atkinson and Miller approaches to providing asymmetrical compression and expansion ratios not only differ in their methodologies from the present invention, they both also offer smaller differences between compression ratio and expansion ratio. As illustrated earlier, the expansion ratio in any engine based on the instant invention will typically be larger than its associated compression ratio by a factor of from 4-to-1 to 8-to-1. For the Atkinson cycle, the "ratio of ratios" appears to be limited to a factor of 2 at most; considerations of mechanical practicality suggest that the factor will usually be in the range of 1.2 to 1.3.

The compression ratio of the Miller cycle as described for two-stroke engines can in principle approach zero. If an infinitesimally small amount of fuel is used, only a small amount of air need be retained near TDC by waiting until then to close the exhaust valve that is dumping previously-loaded air. The resultant efficiency enhancement at low power tends to be somewhat academic because high efficiency when little or no power is being generated confers little practical advantage. The apparent improved efficiency of the engine cycle must also be discounted to some degree because the originally supplied excess air was made available with help from a turbocharger, and the turbocharger cannot be assumed to be providing much air if the engine is producing a very small amount of power. At moderate power levels and above, as more of the original air is retained, the effective compression ratio increases back toward equivalence with the expansion ratio. Thus under application conditions where significant power is produced—and where efficiency thus becomes more important—the ratio of ratios for the two-stroke Miller cycle tends to fall back down into the range of 2-to-1 or less.

The present invention specifically intends and includes induction of new air on each cycle in amounts larger than the amount needed for combustion—the stoichiometric amount. In addition to its direct effect on oxygen availability, providing excess air also means that the recirculated part of the exhaust 160 will contain oxygen not used during the previous power stroke. Both new oxygen and some retained oxygen are thus usually available to support combustion.

The partial exhaust-gas recirculation (EGR) 160 used in the invention is related to the so-named method that is well known and has long been used for reducing combustion-chamber temperature and reducing the by-production of some pollutants. In earlier or still-extant applications, the supplementary gas is typically re-routed from the exhaust passages back into the intake path through an auxiliary port or valve after it has partially cooled. Because of the limitations in conventional engines on total air-plus-EGR mass that can be taken in during an intake stroke, the amount of EGR in these applications is typically small compared to that of the new air. In the present invention the amount of recirculated gas is usually at least twenty percent of the total charge fed back to TDC, and often substantially more.

In engines following the invention that are being operated at moderate fractions of their intended maximum values of rotational speed and power output, the total mass of the air-plus-exhaust charge can be up to three or more times the mass of stoichiometric air. Availability under most operating conditions of such liberal amounts of combined new air and recirculated exhaust constitutes an improved counterpart of the existing pollution-control technique usually known as "lean-burn." Its fundamental rationale is to reduce peak combustion and post-combustion temperatures by requiring more material to be heated by the same amount of energy. Lower temperatures are known to reduce the production of some pollutants, particularly oxides of nitrogen.

In typical current use of the lean-burn technique, the amount of excess air relative to the stoichiometric amount is typically small, and in any case tends to be carefully restricted because too much air can interfere with the ignition and combustion of the fuel.

Inhibition of ignition would not apply in engines that use hydrogen as fuel, because hydrogen-air mixtures ignite readily at hydrogen concentrations of from 4 or 5 percent to 75 percent or more by volume. The instant invention envisions the potential for eventual use with hydrogen fuel; in such use the provision of large amounts of recirculated exhaust gas and of excess air in the pre-combustion cylinder charge would be tolerable without significant concern over ignitability of the fuel.

Natural gas is ignitable over a much smaller range of mixture ratios than is hydrogen. However, in engines based on the invention the ignition conditions using natural gas as fuel are markedly different from those of typical current practice. In the invention, the fuel is not mixed into the air charge during or before the compression cycle, but rather injected just before ignition; because of the finite duration of injection, fuel continues entering the combustion volume somewhat beyond the start of ignition. The ignition means 60 is presumed to be located in close proximity to the injection point 50; its parameters and location are in any event tailored to the characteristics of the fuel and its injection. As the fuel leaves the injector 50 or injectors 50, mixing ratios from 100 percent fuel down to excessively lean can potentially prevail locally as the fuel disperses through the combustion chamber; whenever the local mixing ratio falls into a range suitable for ignition, ignition seems probable. Further enhancing the prospects for full combustion in engines following the invention is the fact that preignition temperatures are typically high compared to those prevailing in conventional engines.

By similar arguments, ignition and combustion of liquid fuels in engines 10 of the invention are believed to be practical even with large amounts of excess oxygen and working fluid.

The intended deliberate use in the invention of substantially more air than is needed to support combustion has a counterpart in the use of bypass air to improve the efficiency of aircraft jet engines. The turbofan engine, introduced in the 1970s specifically to improve both thrust and efficiency, uses some of its input air for combustion, but allows some to be bypassed around the power-generating turbine and then pumped out through the propulsion nozzle along with the turbine exhaust gases by a "fan" mechanically driven by the turbine. In engines following the present invention, the extra amounts of air and other gases both increase the amount and lower the temperature of the working fluid, and also provide the convenient availability of oxygen wherever fuel is present. The turbofan parallel in engines embodying the invention will be most apt when the combustion of fuel in steady-state moderate-power operation normally takes place in a well-defined region of the combustion chamber centered around the injector or injectors. The portion of the air-plus-EGR charge that is further out approximates the role of the bypass air in the turbofan; it can also mimic the afterburner mode of the turbofan during acceleration, wherein excess fuel is deliberately injected and burned in the "bypass" air in both applications to provide increased power for short periods.

All substantiation and projection of the properties of the invention has been done by analysis or computer simulation. Selected results of the various simulations are shown in Tables 1, 2, 3, and 4.

The simulations all assume the use of a dedicated reciprocating compressor 110, and assume that mild turbocharging is used to boost the air pressure at the input to the main compressor. It is estimated that the turbocharger 130 will provide one psi of boost at the compressor input for every 1,200 RPM of engine (and compressor) speed. The estimate is based on the expectation that it is reasonable for an exhaust-driven 132 turbocharger 130 on a two-stroke engine operating at 7200 RPM to be able to produce at least 6 psi of boost.

Table 1 illustrates the behaviors and tendencies of engines 10 based on the invention as the expansion ratio and the amounts of new air and recirculated 160 exhaust gas ("EGR") are varied. A fixed speed of 3,600 RPM and a fixed rate of energy input of 45 horsepower are used throughout. Both are chosen to be moderate relative to the expected maximum capabilities of an engine of the illustrated dimensions. The figures in the table are derived by computer simulation of the expected behavior of a single cylinder 12 of a multiple-cylinder engine 10. The assumed parameters are, as shown, a bore of 3.0 inches and a stroke of 4.0 inches. The amounts of new air and of recirculated exhaust gas (in millionths of a pound, or micropounds) are varied at each expansion ratio setting by advancing the angle at which intake begins (and exhaust ends) from 300 degrees to 320 degrees in 5-degree increments.

The column heading QSR represents the so-called quasi-stoichiometric ratio, which is the ratio of the combined mass of new air and recirculated exhaust gas 160 with which the cylinder 12 is charged prior to fuel injection to the mass of air which would provide exactly the amount of oxygen needed for combustion. "TSR" stands for true stoichiometric ratio; it represents the ratio of the mass of oxygen in the preignition charge to the stoichiometric amount of oxygen.

TABLE 1

3-inch bore, 4-inch stroke, 3600 RPM, 45 input HP
Mass (new air, EGR): micropounds; temperature: degrees F.; pressure: psia

| | TDC | | | Peak | | BDC | | Available | |
|---|---|---|---|---|---|---|---|---|---|
| new air | EGR | QSR | TSR | temp | press | temp | press | HP | Efficiency, % |
| 67.5-to-1 expansion: | | | | | | | | | |
| 453 | 317 | 2.641 | 1.941 | 3338 | 3985 | 332 | 15 | 21.49 | 47.75 |
| 406 | 262 | 2.290 | 1.665 | 3572 | 3712 | 385 | 14 | 21.73 | 48.28 |
| 360 | 213 | 1.965 | 1.430 | 3855 | 3452 | 450 | 14 | 21.83 | 48.51 |

TABLE 1-continued 3-inch bore, 4-inch stroke, 3600 RPM, 45 input HP
Mass (new air, EGR): micropounds; temperature: degrees F.; pressure: psia

| | | | | TDC | | Peak | | BDC | | Available | |
|---|---|---|---|---|---|---|---|---|---|---|---|
| new air | EGR | QSR | TSR | temp | press | temp | press | | | HP | Efficiency, % |
| 316 | 170 | 1.669 | 1.220 | 4202 | 3214 | 535 | 13 | | | 21.93 | 48.74 |
| 274 | 131 | 1.392 | 1.028 | 4602 | 2968 | 644 | 12 | | | 21.72 | 48.26 |
| | | | | | 45.0-to-1 expansion: | | | | | | |
| 465 | 302 | 2.635 | 1.984 | 3310 | 2797 | 406 | 17 | | | 21.02 | 46.70 |
| 418 | 248 | 2.287 | 1.694 | 3552 | 2617 | 467 | 16 | | | 21.13 | 46.96 |
| 373 | 198 | 1.960 | 1.436 | 3853 | 2447 | 547 | 15 | | | 21.22 | 47.15 |
| 330 | 160 | 1.682 | 1.238 | 4146 | 2273 | 627 | 14 | | | 20.93 | 46.50 |
| 288 | 123 | 1.413 | 1.049 | 4563 | 2122 | 750 | 13 | | | 20.83 | 46.29 |
| | | | | | 30.0-to-1 expansion: | | | | | | |
| 484 | 291 | 2.658 | 2.056 | 3268 | 1927 | 490 | 18 | | | 20.18 | 44.85 |
| 437 | 241 | 2.329 | 1.778 | 3497 | 1813 | 554 | 17 | | | 20.20 | 44.89 |
| 393 | 194 | 2.012 | 1.518 | 3778 | 1701 | 638 | 16 | | | 20.14 | 44.77 |
| 351 | 152 | 1.725 | 1.291 | 4089 | 1591 | 734 | 15 | | | 19.90 | 44.22 |
| 310 | 117 | 1.466 | 1.097 | 4448 | 1485 | 852 | 15 | | | 19.55 | 43.45 |
| | | | | | 20.0-to-1 expansion: | | | | | | |
| 512 | 287 | 2.740 | 2.180 | 3177 | 1308 | 576 | 20 | | | 18.88 | 41.97 |
| 466 | 240 | 2.423 | 1.908 | 3395 | 1238 | 643 | 19 | | | 18.87 | 41.94 |
| 422 | 196 | 2.123 | 1.658 | 3642 | 1168 | 723 | 18 | | | 18.75 | 41.67 |
| 381 | 157 | 1.849 | 1.436 | 3939 | 1106 | 821 | 17 | | | 18.64 | 41.43 |
| 342 | 123 | 1.598 | 1.238 | 4243 | 1038 | 930 | 16 | | | 18.24 | 40.54 |

The fuel used in the simulations whose results are shown in Table 1 is pre-pressurized gaseous hydrogen. Both natural gas and liquid petroleum fuels require somewhat more air per fuel BTU than hydrogen does, in the ratio of about 1.4 for gasoline or diesel fuel and about 1.3 for natural gas. Rough but useful projections for the sample engine 10 using one of the other fuels can be interpolated from Table 1 by looking higher in the table to where the amount of air—and typically the total pre-combustion mass of the charge in the cylinder—is enough larger to be appropriate to the alternative fuel. Power, efficiency, and peak temperatures and pressures remain approximately correct when the air-ratio correction is made, but do not track exactly because of altered proportions of new air and EGR.

The simplest design adaptation to a change from say hydrogen to natural gas—along with the necessary changes in the fuel injectors 50—is to increase the effective area of the intake valve ports 20 by about 30 percent, thus tending to admit the properly increased amount of air during about the same intake interval as would be used with hydrogen. The effective diameter of each of two intake ports 20 in each cylinder 12 of the sample configuration represented in the table is 0.6 of an inch. To provide one example of the results of using a fuel other than hydrogen, substituting natural gas as fuel and increasing the intake valve-ports' 20 effective diameter to 0.7 inch generates the following entries in what would be the second line from the top in a natural-gas-based counterpart of Table 1 (units as in the table): new air 481; EGR 267; QSR 1.958; TSR 1.409; peak temperature 3429; peak pressure 3841; BDC temperature 362, BDC pressure 14.9, net available horsepower 21.64, and efficiency 48.10 percent. Crude correspondence is seen between these results and those in the top line of Table 1, where the total cylinder charge is 765 micropounds, as compared to the total for the natural gas example of 748 micropounds.

In most simulations run to date, and specifically those represented in this table, the closing of the intake valve(s) is self-determined. When the cylinder pressure reaches the plenum pressure (due both to the addition of air and the reduction in available volume as the piston rises), intake stops and compression begins. In practice this would not be what happens, but within limits it can be seen to be a satisfactory approximation when the actual application and the actual design are as yet undetermined. As explained above, if the intake valves 20 remain open somewhat after the cylinder pressure reaches that in the air-supply plenum, small amounts of air and vestigial amounts of retained exhaust gas may leak back into the plenum 150, maintaining the cylinder pressure approximately constant as its active volume decreases. As long as such leak-back angular durations are small, the differences between actual performance and the results shown in the Table remain relatively insignificant. In eventual practice, the active control of valve timing and/or of equivalent valve lift is meant to ensure the best available efficiency and minimum pollutant production available at the prevailing engine speed and power.

Table 2 compares the temperature and pressure profiles versus angle, at high speeds and high specific power output, of a high-output variant of the sample engine 10 to those (also by simulation) of a modern high-performance turbocharged automotive diesel operating at the same specific output, namely approximately 140 horsepower per liter. The purpose of the table is to illustrate the invention's potential for reduced generation of oxides of nitrogen. For the sample engine, the values of temperature and pressure are comparable to those of the turbodiesel at and just beyond TDC, but fall well below from about 12 degrees onward. At larger angles, both quantities drop much faster from their peak values for the sample engine, leaving less time for the persistence of any combination of conditions that would promote nitrogen oxidation.

TABLE 2

Cylinder temperatures and pressures during power and exhaust strokes
(Angle from TDC, degrees; temperature, degr. F.; pressure, psia)

High-output 1.85-L I-4 engine using the invention (2-stroke):

| | | |
|---|---|---|
| 0 | 981 | 1332 |
| 2 | 965 | 1283 |
| 4 | 1412 | 1975 |
| 6 | 2574 | 2773 |
| 8 | 3696 | 3185 |
| 10 | 4261 | 3026 |
| 12 | 4315 | 2585 |
| 14 | 4119 | 2110 |
| 16 | 3930 | 1728 |
| 18 | 3754 | 1424 |
| 20 | 3588 | 1183 |
| 30 | 2910 | 526 |
| 40 | 2432 | 279 |
| 50 | 2080 | 168 |
| 60 | 1814 | 111 |
| 70 | 1607 | 79 |
| 80 | 1444 | 60 |
| 90 | 1313 | 47 |
| 100 | 1208 | 39 |
| 110 | 1123 | 33 |
| 120 | 1055 | 29 |
| 130 | 1001 | 26 |
| 140 | 958 | 24 |
| 150 | 926 | 23 |
| 160 | 902 | 22 |
| 170 | 887 | 21 |
| 180 | 881 | 21 |
| 190 | 876 | 20 |
| 200 | 867 | 18 |
| 210 | 856 | 17 |
| 220 | 841 | 17 |
| 230 | 824 | 17 |
| 240 | 806 | 17 |
| 250 | 785 | 17 |
| 260 | 764 | 17 |
| 270 | 741 | 17 |
| 280 | 718 | 18 |
| 290 | 693 | 19 |
| 300 | 669 | 20 |
| 310 | 643 | 21 |
| 320 | 374 | 41 |
| 330 | 275 | 101 |
| 340 | 463 | 236 |
| 350 | 752 | 674 |

High-output 2.0-L I-4 state-of-the-art turbodiesel (4-stroke):

| | | |
|---|---|---|
| 0 | 1153 | 1319 |
| 2 | 1147 | 1306 |
| 4 | 1579 | 1801 |
| 6 | 2268 | 2317 |
| 8 | 3447 | 3137 |
| 10 | 4056 | 3413 |
| 12 | 4535 | 3528 |
| 14 | 4577 | 3320 |
| 16 | 4485 | 3031 |
| 18 | 4389 | 2756 |
| 20 | 4292 | 2497 |
| 30 | 3818 | 1517 |
| 40 | 3403 | 956 |
| 50 | 3060 | 639 |
| 60 | 2778 | 453 |
| 70 | 2548 | 339 |
| 80 | 2359 | 265 |
| 90 | 2203 | 215 |
| 100 | 2075 | 181 |
| 110 | 1970 | 157 |
| 120 | 1884 | 139 |
| 130 | 1815 | 127 |
| 140 | 1760 | 118 |
| 150 | 1717 | 111 |
| 160 | 1686 | 107 |
| 170 | 1666 | 104 |
| 180 | 1658 | 103 |
| 190 | 1652 | 93 |
| 200 | 1640 | 85 |
| 210 | 1624 | 77 |
| 220 | 1604 | 70 |
| 230 | 1580 | 64 |
| 240 | 1552 | 59 |
| 250 | 1519 | 54 |
| 260 | 1484 | 50 |
| 270 | 1444 | 46 |
| 280 | 1401 | 42 |
| 290 | 1354 | 38 |
| 300 | 1302 | 34 |
| 310 | 1246 | 29 |
| 320 | 1182 | 23 |
| 330 | 1109 | 18 |
| 340 | 1030 | 16 |
| 350 | 959 | 15 |

The simulation of the diesel engine used liquid diesel fuel; that of the engine of the present invention continued to use hydrogen.

References to engines 10 representing the invention as being in an "I-4" configuration are incidental; in any embodiment, the number of cylinders and their physical arrangement is at the option of the designer.

Table 3 compares the behavior of engines 10 based on the invention to simulated approximations of the behavior of several four-stroke-cycle engines typical of existing practice. It is presented to substantiate the validity of the simulations by showing the similarity of the predicted performance of existing engines to public claims, and to further support the claimed expectation that the present invention will foster improved efficiency. The results presented offer evidence of reasonably realistic modeling of intake and exhaust behavior, of heat and friction losses, of the allocation of a portion of driveshaft power to essential engine accessory functions such as valve actuation, cooling, lubrication, ignition, and engine management, and, for the sample engines 10 representing the principles of the invention, of the power needed to run a dedicated air compressor and to account for the compressor's 110 losses and for the performance of its accessory functions.

The low-expansion-ratio overhead-valve engines are simulated using an approximate representation of United States pump gasoline. The Formula 1 engine simulation (based on the engine rules used in the race series in 2013) assumes a lighter-weight higher-energy-content petroleum-based fuel, and the diesel engine uses diesel fuel. Engines of the present invention continue to be represented by their performance using hydrogen.

TABLE 3

Comparisons (by simulation) among conventional engines and two examples of engines using the invention.

| Est. maximum power: | RPM | (Peak) T | p | BHP | HP/L | % eff. |
|---|---|---|---|---|---|---|
| Non-turbo 3.8-L V-6, OHV: | 4900 | 4433 | 943 | 205.0 | 54.0 | 31.0 |
| Turbo 6.2-L V-8, OHV: | 5600 | 4410 | 1191 | 480.0 | 77.4 | 29.8 |
| 2.0-L I-4 turbodiesel, DOHC: | 6000 | 4635 | 4276 | 355.0 | 177.5 | 36.8 |
| 2.4-L Formula 1 V-8, DOHC: | 18,000 | 4655 | 1880 | 720.0 | 300.0 | 33.4 |
| 1.85-L I-4 high-output 2-stroke: | 7200 | 4338 | 3199 | 260.2 | 140.5 | 50.8 |
| 1.2-L I-4 2-stroke: | 5500 | 3474 | 3336 | 88.4 | 47.8 | 46.1 |

| | RPM | (Peak) T | p | BHP | % eff. | MPG |
|---|---|---|---|---|---|---|
| 65-mph level cruise: | | | | | | |
| Non-turbo 3.8-L V-6, OHV: | 2500 | 4329 | 563 | 45.6 | 26.9 | 18.4 |
| Turbo 6.2-L V-8, OHV: | 2000 | 4232 | 487 | 46.6 | 24.8 | 16.5 |
| 2.0-L I-4 turbodiesel, DOHC: | 3000 | 4523 | 1190 | 36.4 | 32.2 | 29.6 |
| 1.85-L I-4 high-output 2-stroke: | 2800 | 4059 | 1865 | 33.0 | 40.6 | 38.2 |
| 1.2-L I-4 2-stroke: | 3600 | 3420 | 2344 | 33.0 | 44.1 | 41.5 |
| 65 mph climbing 5% grade: | | | | | | |
| Non-turbo 3.8-L V-6, OHV: | 3000 | 4384 | 684 | 76.2 | 29.3 | 11.9 |
| Turbo 6.2-L V-8, OHV: | 2400 | 4292 | 566 | 74.5 | 27.3 | 11.4 |
| 2.0-L I-4 turbodiesel, DOHC: | 3600 | 4571 | 1491 | 64.3 | 34.8 | 18.1 |
| 1.85-L high-output 2-stroke: | 3360 | 3716 | 2658 | 58.7 | 45.8 | 24.3 |
| 1.2-L I-4 2-stroke: | 4320 | 3755 | 2752 | 58.7 | 47.0 | 24.9 |

The road-horsepower requirements for the passenger cars were estimated assuming that the V-6 powers a domestic mid-size sedan, the OHV V-8 a domestic sports coupe, the turbodiesel a compact SUV, and that the two two-stroke engines each power the same size compact economy sedan or hatchback.

The inclusion of the Formula 1 engine in the table reflects the recognition of some unexpected parallels between it and preferred embodiments of the invention. The stroke of the racing engine is only 40.5 percent of the bore. Accordingly, the chamber enclosed by the piston, the cylinder, and the cylinder head is always shallow. This characteristic shallowness, coupled with the high speeds of rotation, is reflected in fairly close quantitative correspondence with the high-expansion-ratio embodiments of the invention as to the loading of large amounts of air into a shallow space in a short time, and as to the accomplishment of combustion and heat propagation in a shallow space in a short time; the rates and patterns of combustion and heat propagation used in the simulations were guided and bounded by those constrained to prevail in the Formula 1 engine by virtue of its shallow combustion chambers and high operating speed.

Table 4 shows sample sequences of variation of total cylinder charge, temperature, and pressure through the most distinctly unique portion of the two-stroke cycle 200 of the present invention, namely the angular range from the latter part of the exhaust phase through intake and compression back to TDC. Two different sets of operating conditions are illustrated: a high-specific-output engine running at 7200 RPM using a plenum pressure of 90 psia and a moderate-power engine running at 3600 RPM using a plenum pressure of 70 psia. Following the progression of angular positions downward in each column in 2-degree steps shows at first the continuing departure of exhaust gas through the open exhaust valve (or valves) 22, then the transition to increasing total charge as exhaust ends and intake begins, the stabilization of total charge as intake ends, and the increases in temperature and pressure during the final compression phase.

TABLE 4

Exhaust-termination, intake, and compression sequences of two examples of engines using the invention.
(Angle, degrees; cyl. charge, micropounds: temperature (F.); pressure, psia)

Moderate-output small engine at 3600 RPM:

| | | | |
|---|---|---|---|
| 282: | 354 | 398 | 17 |
| 284: | 343 | 396 | 17 |
| 286: | 332 | 393 | 17 |
| 288: | 321 | 391 | 17 |
| 290: | 309 | 388 | 17 |
| 292: | 297 | 385 | 17 |
| 294: | 285 | 383 | 17 |
| 296: | 273 | 380 | 17 |
| 298: | 261 | 377 | 17 |
| 300: | 248 | 375 | 17 |
| 302: | 236 | 372 | 17 |
| 304: | 224 | 369 | 17 |
| 306: | 211 | 366 | 17 |
| 308: | 199 | 364 | 17 |
| 310: | 186 | 361 | 17 |
| 312: | 174 | 358 | 17 |
| 314: | 162 | 355 | 17 |
| 316: | 181 | 329 | 19 |
| 318: | 227 | 293 | 24 |
| 320: | 275 | 266 | 30 |
| 322: | 325 | 246 | 37 |
| 324: | 375 | 231 | 45 |
| 326: | 420 | 220 | 55 |
| 328: | 456 | 213 | 65 |
| 330: | 465 | 220 | 75 |
| 332: | 465 | 249 | 87 |
| 334: | 465 | 281 | 102 |
| 336: | 465 | 316 | 121 |
| 338: | 465 | 353 | 145 |
| 340: | 465 | 395 | 175 |
| 342: | 465 | 440 | 213 |
| 344: | 465 | 489 | 262 |
| 346: | 465 | 542 | 324 |
| 348: | 465 | 598 | 402 |
| 350: | 465 | 657 | 498 |
| 352: | 465 | 716 | 612 |
| 354: | 465 | 772 | 736 |
| 356: | 465 | 819 | 856 |
| 358: | 465 | 852 | 946 |

TABLE 4-continued

Exhaust-termination, intake, and compression sequences of
two examples of engines using the invention.
(Angle, degrees; cyl. charge, micropounds: temperature (F.);
pressure, psia)

| 360: | 465 | 864 | 980 |
|---|---|---|---|
| High-output small engine at 7200 RPM: | | | |
| 282: | 279 | 713 | 18 |
| 284: | 272 | 708 | 18 |
| 286: | 264 | 703 | 19 |
| 288: | 257 | 698 | 19 |
| 290: | 250 | 693 | 19 |
| 292: | 242 | 688 | 19 |
| 294: | 234 | 684 | 19 |
| 296: | 226 | 679 | 19 |
| 298: | 218 | 674 | 20 |
| 300: | 209 | 669 | 20 |
| 302: | 201 | 664 | 20 |
| 304: | 192 | 659 | 20 |
| 306: | 183 | 653 | 20 |
| 308: | 174 | 648 | 21 |
| 310: | 165 | 643 | 21 |
| 312: | 156 | 638 | 21 |
| 314: | 147 | 632 | 21 |
| 316: | 162 | 580 | 23 |
| 318: | 244 | 450 | 31 |
| 320: | 331 | 374 | 41 |
| 322: | 420 | 325 | 52 |
| 324: | 505 | 293 | 66 |
| 326: | 577 | 273 | 80 |
| 328: | 607 | 265 | 92 |
| 330: | 586 | 275 | 101 |
| 332: | 586 | 306 | 117 |
| 334: | 586 | 340 | 138 |
| 336: | 586 | 377 | 163 |
| 338: | 586 | 418 | 196 |
| 340: | 586 | 463 | 236 |
| 342: | 586 | 513 | 288 |
| 344: | 586 | 566 | 354 |
| 346: | 586 | 625 | 437 |
| 348: | 586 | 687 | 543 |
| 350: | 586 | 752 | 674 |
| 352: | 586 | 818 | 829 |
| 354: | 586 | 879 | 999 |
| 356: | 586 | 932 | 1163 |
| 358: | 586 | 967 | 1285 |
| 360: | 586 | 981 | 1332 |

The simulation recalculates all pertinent quantities at one-tenth-degree intervals in critical parts of the cycle 200, but in order to enable compact presentation only samples taken every two degrees are shown in the table.

During the latter parts of the exhaust phase, the pressure in the moderate-power example is seen to hold approximately steady at an indicated (rounded-off) value of 17 psia. In the same section of the higher-output sample, the pressure is somewhat higher and is rising slowly as the cylinder volume contracts, because the speed is twice as high, leaving the exhaust valve 22 harder pressed to empty rapidly enough to keep up with the upward motion of the piston 14.

When intake begins, both the amount of charge and the pressure begin to rise as new air is added. The duration of the intake phase can be seen in the data by noting the angular location at which the total cylinder charge stops increasing, approximately 330 degrees in the moderate-power example and 328 degrees in the other. The ability of the high-output engine to accumulate a larger charge of new air over a slightly smaller angle span even at double the speed is due to its larger intake valves and higher plenum pressure.

In engines 10 based on the invention, conventional cam-driven poppet valves 20, 22 may be used for both intake and exhaust, as may whatever novel future provisions may arise for cylinder-head valving and for the control of its timing and gas-throughput properties. Conventional means of lubricating and cooling and conventional electrical systems may be used, as may any other arrangements for these functions as may be chosen or conceived by future designers.

Modern automotive engines typically do not use a stroke larger than their bore. The choice of a 4-inch stroke and a 3-inch bore in the "sample" embodiment was intended to make it easier at the preferred high expansion ratios to provide headroom for fitting in spark plugs 60 (or equivalent) and fuel injectors 50 and to help ensure valve-to-piston clearance. Engines 10 embodying the invention may use any bore-to-stroke ratio determined by the eventual designers to be appropriate to their functions, requirements, and constraints.

Complementing the reduced tendencies toward the generation of oxides of nitrogen illustrated in Table 2, the emission of unburned fuel in engines 10 based on the invention would be expected to be minimized by the typical availability of excess oxygen at all times, including throughout exhaust.

The likelihood and amount of residual unburned fuel is further reduced by two features of the invention: (1) one third or more of the exhaust is typically recirculated 160, giving a portion of any unburned fuel another chance at being burned. (2) The initiation of acceleration does not require and will seldom create a fuel-rich mixture; there is typically more than the stoichiometric amount of oxygen available during steady-speed operation, and abruptly increasing the amount of fuel injected would normally leave abundant oxygen available for burning the added fuel on the first cycle of the increase.

Note that all design features and parameters of the compressor 100, 110 and plenum 150 are independent of and separate from the invention described herein; this disclosure defines and applies only to the configuration and the mode of operation of the engine. The desired attributes of the compressor 110 and plenum 150 are meant to be specified by the engine designer based on knowledge of the requirements and constraints that pertain to the particular engine embodiment.

A two-stroke reciprocating internal combustion engine 10 may comprise one or more cylinders 12, each such cylinder being enclosed at one end by a so-named cylinder head 12H, the cylinder head 12H to be of any suitable material, design, and construction, each such cylinder 12 sealed at its opposite end by a slidable piston 14, each such piston 14 being mechanically coupled to a common crankshaft 16 or equivalent rotating member 16 in such a way that the rotation of the member 16 about its intended axis of rotation causes the slidable piston 14 in each cylinder 12 to move linearly in a direction parallel to the axis of its associated cylinder 12 through a repeating reciprocating pattern of positions which are determined by the corresponding rotational positions of the crankshaft 16 or equivalent member 16, and wherein the cylinder head 12H of each cylinder 12 is fitted with one or more valved intake ports 20 for the admission of air or other oxygen-bearing gas or oxygen-bearing mixture of gas and vapor, wherein each such cylinder head 12H is also fitted with one or more valved ports 22 for the removal of exhaust products, wherein each such cylinder head 12H is fitted with one or more injectors 50 for the introduction of fuel, the fuel to be of any suitable chemical composition and in any suitable physical form, and wherein each such cylinder head 12H is fitted with one or more spark plugs 60 or other means for ignition 60 of the fuel-air or equivalent combustible mixture, such engine 10 to be operated in a sequence of cycles within each cylinder 12, each such cycle consisting of the injection of fuel, the ignition of the combustible mixture, the combustion and heating of the mixture, the consequent increase in pressure of the heated mixture on the exposed surface of the movable piston resulting in force directed toward pushing the piston 14 away from the enclosed end of its cylinder 12 and thereby causing rotation or maintaining or increasing the existing speed of rotation of the common crankshaft 16, each such propulsive power phase continuing while the power transmitted to the crankshaft 16 remains at a useful level, usually until near the point where the piston 14 has reached its farthest excursion away from the cylinder head 12H, whereupon the exhaust valve or valves 22 are opened to begin the exhaust phase of the rotational cycle, such exhaust phase continuing until the piston 14 has moved back toward the cylinder head 12H to a point that is generally between one-half and three-quarters of the way back to its closest approach to the cylinder head 12H, as measured by the progress of rotation of the crankshaft 16, whereupon the exhaust valve or valves 22 are closed, thus deliberately retaining a desired fraction of the exhaust products for use as supplementary working fluid and as a combustion modifier for the next following power phase, and whereupon at approximately the same time as the exhaust phase ends the intake phase begins, wherein the intake valve or valves 20 are opened to permit the admission of pressurized air or other pressurized oxygen-bearing gas or oxygen-bearing gas-vapor mixture in the amount required for combustion of the next following cycle's injected fuel, or in such larger amount than is required for combustion as may be determined to be beneficial to the control of peak temperature or to the operating efficiency of the engine 10, such intake phase to continue as long as may be required for the accumulation of the desired amount of oxidant at the known rotational speed of the crankshaft 16 and at the pressure known to prevail in the oxidant source, the pressure preferably to be at least 30 pounds per square inch absolute (psia) and in no case more 200 psia, whereupon the intake valve or valves 20 are closed, and the action of other cylinders 12 of the engine 10 together with the momentum of its rotating parts and its load serves to continue rotation and to compress the mixture of new oxidant and retained exhaust products (EGR) 160 until the piston 14 reaches approximately its point of closest approach to the cylinder head 12H in preparation for the next following cycle's fuel-injection and ignition. Any suitable sizes and arrangement of the valved ports 20, 22 for the admission of oxidant and for the emission of exhaust may be used, wherein the valves 20, 22 for opening and closing the ports may be of any suitable type and may use any suitable mechanisms for the actuation of opening and closing and for the control of opening and closing times and for control of the effective apertures of the associated valved ports 20, 22, such aperture control to be effected by any suitable means, including as one possibility the variation of the amount by which the valves are opened, and as another possibility the use of controllable separate throttling valves in the external conduits by which gases enter or leave the valved ports 20, 22. The expansion ratio within the cylinder or cylinders 12 is preferably 50-to-1 or more and at least 15-to-1, the expansion ratio being that of the volume contained within each enclosed cylinder 12 when the piston 14 is farthest away from the cylinder head 12H to the volume so contained when the piston 14 is nearest the cylinder head 12H, the ratio to be chosen by the designer of each specific embodiment to be as large as may be practical and as may be beneficial to efficiency and to the control of pollutants. The air or other oxidant mixture may be compressed by and supplied from a source independent of the engine 10. Alternatively, the compressed air may be supplied by an air source 100, compressing mechanism 100 or "compressor" 100, 110 dedicated to the engine 10, the compressor 100, 110 to use ambient air as the source of its own input, and the compressor 100, 110 either (a) directly driven by the engine 10 shaft 16 through mechanical or hydraulic coupling, a special instance of which consists of the incorporation of the compressor 100, 110 into the engine 10 structure where it can make such use as may be appropriate of the engine 10 crankshaft 16 and of the cooling, lubrication, and valve-actuation provisions of the engine 10, or (b) electrically driven by a motor 112 whose power may come from an existing independent source or from the electrical system of the vehicle or other installation in which the engine 10 may be mounted. The dedicated air supply 100 or compressor 100, 110 may deliver air to the engine 10 intake ports 20 by way of a plenum 150 or reservoir 150 whose size and design shall accomplish adequate isolation—or "buffering"—of the engine 10 from pressure fluctuations coming from the compressor 100, 110 and adequate isolation or buffering of the compressor 100, 110 from air-demand fluctuations at the engine 10, the plenum 150 or reservoir 150 also to provide post-cooling of the air being delivered to the engine 10, by radiation, conduction, and convection from its outer surface, so as to ensure that the temperature of the air delivered to the engine 10 intake ports 20 will be as close as possible to the ambient temperature of the air surrounding the engine 10. Alternatively, the input air to the dedicated compressor 100, 110 may be supplied by a turbocharger 130 driven 132 by the exhaust gas from the engine 10, thereby potentially reducing the size and power requirements of the primary compressor 110, the turbocharger's 130 output air to be delivered whenever practical through an intercooler 120 in order to reduce the temperature and increase the density of the air delivered to the compressor 110. Air may be supplied 140 to the engine 10 by way of a post-cooling and pressure-buffering plenum 150, directly from a turbocharger 130 driven 132 by exhaust gas from the engine 10.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to any particular embodiment disclosed herein as the best mode contemplated for carrying out this invention, but that the invention will include all embodiments falling within the scope of the appended claims.

| Item Number | Item Name |
| --- | --- |
| 1 | Top Dead Center (TDC) = 0° |
| 1-2 | Combustion - Power |
| 2 | Bottom Dead Center (BDC); Open Exhaust Valve |
| 2-3 | Exhaust |
| 3 | Close Exhaust Valve; Open Intake Valve |
| 3-4 | Intake |
| 4 | Close Intake Valve |
| 4-5 | Compression |
| 5 = 1 | TDC (Injection of Fuel & Ignition precede TDC) |
| 10 | Engine |
| 12 | Cylinder |
| 12H | Cylinder Head |
| 12W | Cylinder Wall |
| 14 | Piston |
| 16 | Crankshaft |
| 16A | Crank Arm |
| 16P | Crank Pin |
| 18 | Connecting Rod |
| 20 | Intake Valve, Port |
| 22 | Exhaust Valve, Port |
| 30 | "Air" Intake |
| 32 | Intake Manifold |
| 40 | Exhaust |

| Item Number | Item Name |
| --- | --- |
| 42 | Exhaust Manifold |
| 50 | Injector |
| 60 | Igniter (e.g., Spark Plug) |
| 100 | Pressurized "Air" (Oxidant) Supply |
| 110 | Compressor |
| 112 | Compressor Drive [E.g., Hydraulic or Shaft Drive] |
| 120 | Intercooler |
| 130 | Turbocharger |
| 132 | Turbocharger Drive [E.g., Exhaust Gas] |
| 140 | Air supply (from Turbocharger) |
| 150 | Intake Plenum (Chamber) & Cooler |
| 160 | Exhaust Gas Recirculation |
| 200 | Operating Cycle Timing |

What is claimed:

1. A two-stroke reciprocating internal combustion engine comprising: one or more cylinders, each cylinder having a wall and being closed at one end by a cylinder head, a piston in each cylinder, each piston being slidably movable in reciprocating movement in the cylinder and sealed at the cylinder wall, whereby each piston and cylinder define an enclosed cylinder volume that decreases in size as the piston moves nearer to the cylinder head and increases in size as the piston moves farther from the cylinder head; a common rotatable crankshaft mechanically connected to the piston in each of the one or more cylinders, whereby rotation of the crankshaft about its axis of rotation and repeating reciprocating movement of the slidable piston in each cylinder in a direction parallel to the axis of its associated cylinder are in direct correspondence to each other, wherein top dead center is defined as the point where the piston is closest to the cylinder head and as an angle of 0° of rotation of the common crankshaft, and wherein bottom dead center is defined as the point where the piston is farthest from the cylinder head and where the common crankshaft has rotated 180° from top dead center, one or more valved intake ports in the cylinder head of each cylinder which are openable for the admission of an oxidant, wherein the oxidant includes air or another oxygen-bearing gas or an oxygen-bearing mixture of a gas and vapor, a source of oxidant under pressure coupled to the one or more valved intake ports of each cylinder to provide pressurized oxidant to the one or more cylinders, wherein the oxidant is pressurized at a pressure in a range between 25 pounds per square inch absolute (psia) and 200 psia, and wherein the pressurized oxidant is provided at a temperature at or near to ambient temperature, one or more valved exhaust ports in the cylinder head of each cylinder which are openable for removal of exhaust gas products resulting from combustion, one or more injectors in the cylinder head of each cylinder for the introduction of fuel into the enclosed cylinder volume, wherein such engine is operable in a repeating sequence of cycles within each cylinder, each cycle for each cylinder commencing with a compressed charge including oxidant and retained exhaust gas products in the enclosed cylinder volume with the piston near top dead center, each cycle for each cylinder comprising: an injection of fuel into the compressed charge when the piston is near top dead center to form a combustible mixture, an ignition of the combustible mixture, combustion, heating and expansion of the ignited combustible mixture in a power phase, the consequent increase in pressure thereof on the movable piston tending to push the piston away from the cylinder head resulting in torque on the common crankshaft, whereby the crankshaft tends to maintain or increase its rate of rotation, the power phase continuing while power from combustion, heating and expansion of the ignited combustible mixture is transmitted via the piston to the crankshaft until the point where the piston has reached its farthest excursion away from the cylinder head at bottom dead center, whereupon the one or more valved exhaust ports are opened to begin an exhaust phase of the cycle, the exhaust phase continuing until the piston has moved back toward the cylinder head to a point that is between one-half and three-quarters of the rotation of the common—crankshaft from bottom dead center towards top dead center, whereupon the one or more valved exhaust ports are closed to end the exhaust phase and to deliberately retain a desired fraction of the exhaust gas products for use as supplementary working fluid and as a combustion modifier for the next following power phase, opening the one or more valved intake ports at approximately the same time as the closing of the one or more valved exhaust ports to begin an intake phase substantially at the end of the exhaust phase, the opening of the one or more valved intake ports permitting the admission of pressurized oxidant into the retained exhaust gas products in the enclosed cylinder volume in an amount at least as large as an amount required for combustion of fuel to be injected in the next following cycle, closing the one or more valved intake ports to end the intake phase at a point in the cycle whereat the pressurized oxidant in the enclosed cylinder volume is in an amount at least as large as the amount required for combustion of the fuel to be injected in the next following cycle, whereby the cylinder is charged with retained exhaust gas products and intake oxidant under pressure in an amount larger than is required for combustion and that serves to control a peak temperature or operating efficiency of the engine, whereupon the action of other cylinders of the engine, if any, together with the momentum of rotating parts of the engine and its load serves to continue rotation of the common crankshaft and movement of the piston to compress the mixture of oxidant and retained exhaust gas products until the piston approaches top dead center in preparation for the injection of fuel and ignition of the next following cycle; wherein the expansion ratio within each cylinder is 40-to-1 or more.

2. The engine of claim 1 in which the ignition of the combustible mixture when the piston is near top dead center is initiated by:
   heat and pressure resulting from compression of the combustible mixture; or
   one or more igniting devices in the cylinder head of each cylinder, or
   one or more spark plugs in the cylinder head of each cylinder.

3. The engine of claim 1 in which the source of oxidant under pressure includes a plenum receiving oxidant under pressure and coupled to the one or more valved intake ports of each cylinder to provide pressurized oxidant to the one or more cylinders, wherein the plenum reduces pressure variations of the pressurized oxidant at the one or more valved intake ports and cools the pressurized oxidant.

4. The engine of claim 3 in which the source of oxidant under pressure includes a compressor,
   in which the plenum has a size to reduce pressure fluctuations of the compressor output and to isolate the compressor from oxidant-demand fluctuations at the engine, and
   in which the plenum provides cooling of the pressurized oxidant delivered to the engine by radiation, conduction, and convection from an outer surface to reduce the temperature of the pressurized oxidant delivered to the engine intake ports substantially to the temperature of the ambient air surrounding the engine.

5. The engine of claim 3 including a turbocharger driven by exhaust gas from the engine to supply air directly to the plenum.

6. The engine of claim 1 wherein the one or more valved intake ports, the one or more valved exhaust ports, or both, include:
an actuation mechanism for opening and closing one or more valves associated with each of the one or more valved intake ports and with each of the one or more valved exhaust ports.

7. The engine of claim 6 wherein the actuation mechanism controls an effective aperture of the one or more valves associated with the valved ports by varying an amount by which each of the one or more valves are opened.

8. The engine of claim 6 wherein the actuation mechanism controls an opening time and a closing time of each of the one or more valves.

9. The engine of claim 6 wherein the actuation mechanism controls an effective aperture of the one or more valves associated with the valved ports by:
using a controllable throttling valve in a conduit by which pressurized oxidant enters the one or more valved intake ports or leave the valved ports,
using a controllable throttling valve in a conduit by which exhaust gas products leave the one or more valved exhaust ports, or
using a controllable throttling valve in a conduit by which pressurized oxidant enters the one or more valved intake ports or leave the valved ports and a controllable throttling valve in a conduit by which exhaust gas products leave the one or more valved exhaust ports.

10. The engine of claim 1 in which an expansion ratio within each cylinder is at least 15-to-1, wherein the expansion ratio is the ratio of the enclosed cylinder volume at bottom dead center to the enclosed cylinder volume at top dead center.

11. The engine of claim 1 in which the source of oxidant under pressure is independent of the engine.

12. The engine of claim 1 in which the source of oxidant under pressure includes a compressor dedicated to the engine, in which ambient air is included in the input to the compressor.

13. The engine of claim 12 in which the compressor:
is directly driven by the engine crankshaft through mechanical or hydraulic coupling, or
is directly driven by the engine crankshaft through mechanical or hydraulic coupling and is included into the engine structure and uses cooling, lubrication, and valve-actuation provisions of the engine, or
is electrically driven by a motor whose power is provided by an independent source; or
is electrically driven by a motor whose power is provided by an electrical system associated with a vehicle or another installation in which the engine is mounted.

14. The engine of claim 12 in which the ambient air provided to an input of the compressor is supplied by a turbocharger driven by the exhaust gas from the engine, whereby the size and power requirements of the compressor can be reduced.

15. The engine of claim 14 in which the air provided by the turbocharger is delivered through an intercooler to reduce the temperature and increase the density of the air delivered to the input of the compressor.

16. The engine of claim 1 in which the duration of the intake phase is between 15 and 25 degrees of rotation of the common crankshaft.

17. The engine of claim 1 in which the opening the one or more valved intake ports at approximately the same time as the closing of the one or more valved exhaust ports to begin an intake phase substantially at the end of the exhaust phase occurs within 10 degrees of rotation of the common crankshaft from an angle of optimum overall efficiency of the engine.

* * * * *